US010841866B2

(12) United States Patent
Kennedy et al.

(10) Patent No.: US 10,841,866 B2
(45) Date of Patent: Nov. 17, 2020

(54) SENSOR, A MOBILE USER TERMINAL AND A METHOD OF A SENSOR SENSING A MOBILE USER TERMINAL

(75) Inventors: Irwin O. Kennedy, Londonderry (GB); Senad Bulja, Dublin (IE)

(73) Assignee: Alcatel Lucent, Nozay (FR)

( * ) Notice: Subject to any disclaimer, the term of this patent is extended or adjusted under 35 U.S.C. 154(b) by 2020 days.

(21) Appl. No.: 14/237,771

(22) PCT Filed: Jul. 24, 2012

(86) PCT No.: PCT/EP2012/003109
§ 371 (c)(1),
(2), (4) Date: May 20, 2014

(87) PCT Pub. No.: WO2013/020650
PCT Pub. Date: Feb. 14, 2013

(65) Prior Publication Data
US 2014/0248873 A1  Sep. 4, 2014

(30) Foreign Application Priority Data
Aug. 10, 2011  (EP) ...................................... 11290366

(51) Int. Cl.
*H04W 48/16* (2009.01)
(52) U.S. Cl.
CPC ................................. *H04W 48/16* (2013.01)
(58) Field of Classification Search
CPC .................................................. H04W 48/16
See application file for complete search history.

(56) References Cited

U.S. PATENT DOCUMENTS

| 6,628,946 | B1 | 9/2003 | Wiberg et al. |
| 2005/0213566 | A1* | 9/2005 | Jutila ................... H04W 48/18 370/352 |
| 2006/0166694 | A1 | 7/2006 | Jeong et al. |
| 2009/0190550 | A1 | 7/2009 | Giustina et al. |

(Continued)

FOREIGN PATENT DOCUMENTS

| CN | 100348055 C | 11/2007 |
| CN | 101999246 A | 3/2011 |

(Continued)

OTHER PUBLICATIONS

English Bibliography for Chinese Patent Application Publication No. CN100348055C, published Nov. 7, 2007, printed from Thomson Innovation on Aug. 10, 2016, 5 pp.

(Continued)

*Primary Examiner* — Lester G Kincaid
*Assistant Examiner* — Dung L Lam
(74) *Attorney, Agent, or Firm* — Fay Sharpe LLP

(57) ABSTRACT

A method is provided of a sensor sensing a mobile user terminal for cellular radio telecommunications, the user terminal being associated with any one of a plurality of networks, each network having a distinct carrier frequency band for radio signals. The method comprises: broadcasting a common signal at each of multiple carrier frequency bands; the user terminal receiving the signal in the associated carrier frequency band of its network; the user terminal checking information in the received signal, and upon determining that the information is acceptable to allow connection to the sensor, the user terminal acknowledging to the sensor its receipt of the signal.

20 Claims, 4 Drawing Sheets

(56) References Cited

U.S. PATENT DOCUMENTS

| | | | | |
|---|---|---|---|---|
| 2009/0219910 A1* | 9/2009 | Han | ............... | H04J 11/0069 |
| | | | | 370/343 |
| 2009/0258645 A1 | 10/2009 | Ramkull et al. | | |
| 2012/0294694 A1* | 11/2012 | Garot | ............... | F27D 1/141 |
| | | | | 411/427 |

FOREIGN PATENT DOCUMENTS

| | | | |
|---|---|---|---|
| JP | 2003-500950 A | 1/2003 | |
| JP | 2011-518502 A | 6/2011 | |

OTHER PUBLICATIONS

English Bibliography for Chinese Patent Application Publication No. CN101999246A, published Mar. 30, 2011, printed from Thomson Innovation on Aug. 10, 2016, 4 pp.
English Bibliography for Japanese Patent Application Publication No. JP2003500950A, published Jan. 7, 2003, printed from Thomson Innovation on Apr. 28, 2015, 4 pp.
English Bibliography for Japanese Patent Application Publication No. JP2011518502A, published Jun. 23, 2011, printed from Thomson Innovation on Apr. 28, 2015, 4 pp.
PCT Pat. App. No. PCT/EP2012/003109, Written Opinion of the International Searching Authority, dated Aug. 27, 2012, 5 pp.
European Pat. App. No. 11290366, Extended European Search Report, dated Jan. 19, 2012, 6 pp.
3GPP TS 25.304,User Equipment (UE) procedures in idle mode and procedures for cell reselection in connected mode (Release 8); V8.12.0 (Jun. 2011); 50 pages.
International Search Report for PCT/EP2012/003109 dated Aug. 27, 2012.

* cited by examiner

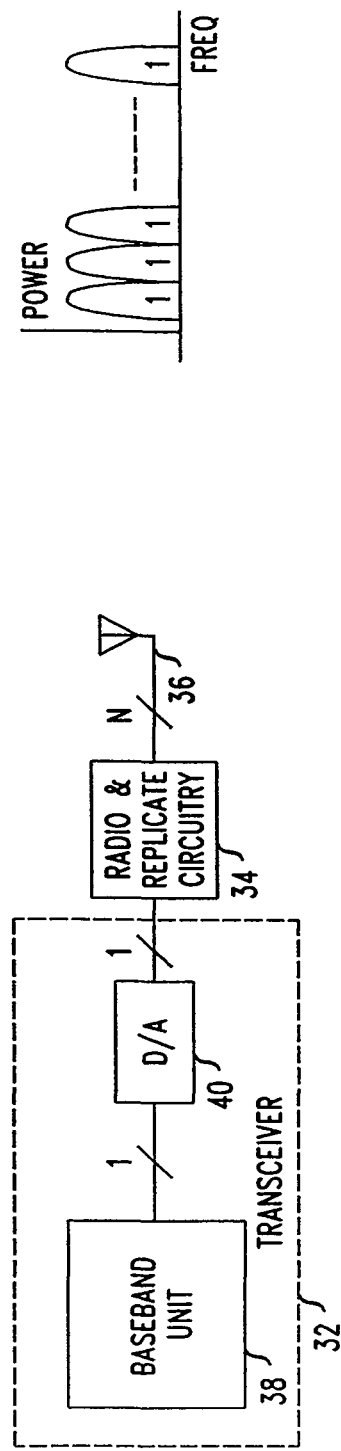
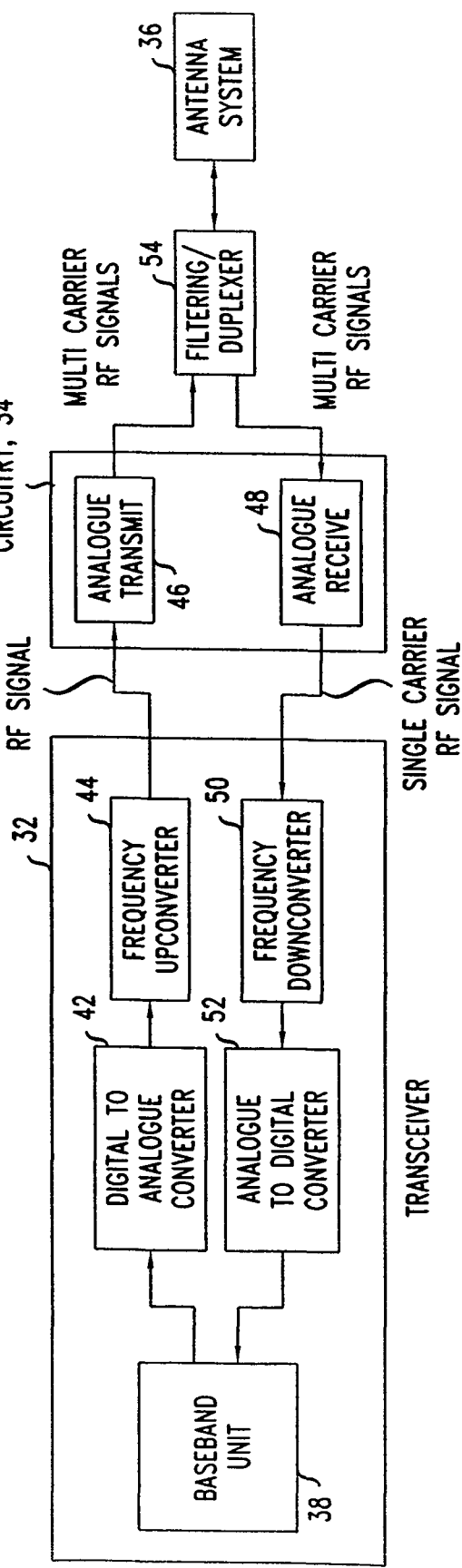

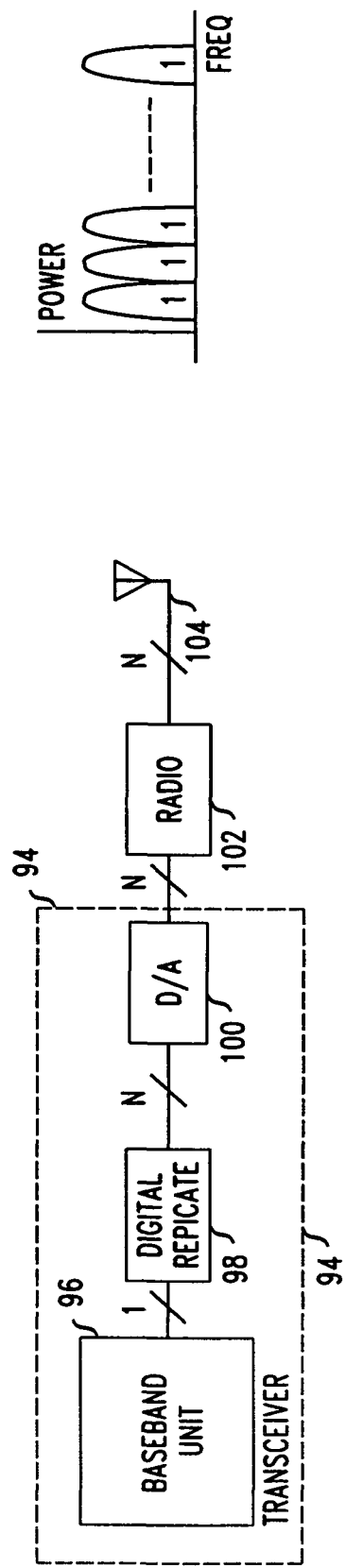
FIG. 6
FIG. 6A
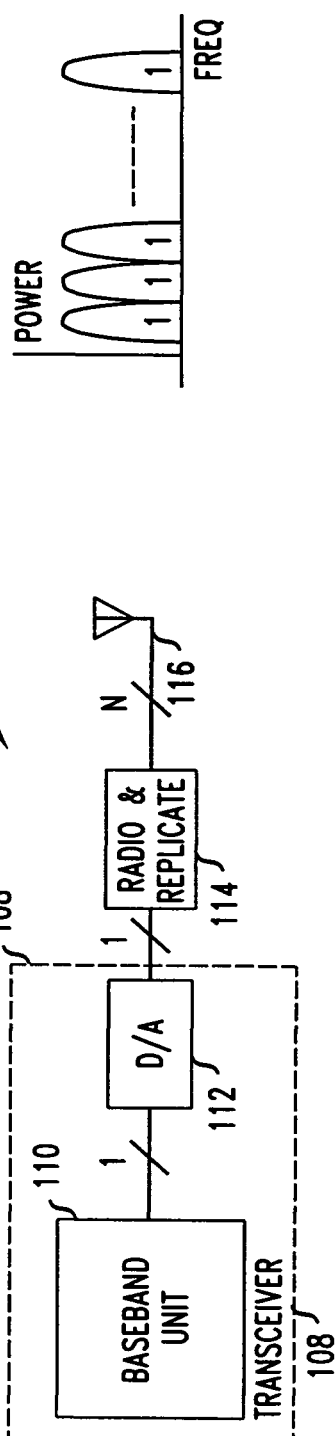
FIG. 7
FIG. 7A

SENSOR, A MOBILE USER TERMINAL AND A METHOD OF A SENSOR SENSING A MOBILE USER TERMINAL

FIELD OF THE INVENTION

The present invention relates to telecommunications, in particular to wireless telecommunications.

DESCRIPTION OF THE RELATED ART

Short range sensors of mobile phones are known. Having ranges of millimetres to metres, a sensor can identify and authenticate a mobile phone that is brought near. A sensor is also a platform providing an Application Programmer Interface for applications, such as payment, or access control, by mobile phone. For example, payment may be performed simply by placing the mobile phone on or near the sensor located at an area for payment near a checkout, and the user is informed of successful payment by a Short Message Service (SMS) message sent to the mobile phone. As regards access control, the mobile phone can be used to lock/unlock a car or a door of a house for example.

When a cellular base station is detected by a user terminal as a candidate to provide service to the user terminal, amongst other things the user terminal inspects the base station's Public Land Mobile Network (PLMN) identifier. PLMNs are different for networks belonging to different network operators, and in some cases networks having certain PLMNs are forbidden to a user terminal, or restricted for the user terminal, for example to only be considered for use if no other suitable candidate network exists.

SUMMARY

The reader is referred to the appended independent claims. Some preferred features are laid out in the dependent claims.

An example of the present invention is a method of a sensor sensing a mobile user terminal for cellular radio telecommunications, the user terminal being associated with any one of a plurality of networks, each network having a distinct carrier frequency band for radio signals. The method comprises: broadcasting a common signal at each of multiple carrier frequency bands; the user terminal receiving the signal in the associated carrier frequency band of its network; the user terminal checking information in the received signal, and upon determining that the information is acceptable to allow connection to the sensor, the user terminal acknowledging to the sensor its receipt of the signal.

In some embodiments the sensor is a cellular base station, which may be small, and works with user terminals of any of multiple different mobile network operators where each network uses a different carrier frequency band.

Some embodiments use a common baseband signal for both transmission by the sensor ("downlink") and reception at the sensor ("uplink") to user terminals using their normal allocated carrier frequency bands.

Some embodiments involve a common baseband signal radiated on multiple carriers. For transmission, the baseband signal may be replicated. For reception, multiple carriers may be combined onto a single carrier and presented for baseband processing as a single signal.

In some embodiments, the PLMN identifier in the baseband signal is set so as to be acceptable to a user terminal associated with any of multiple networks.

In some embodiments, the sensor is a small cell base station, such as a femtocell base station, and a user terminal associated with any of multiple networks/network operators may be sensed.

BRIEF DESCRIPTION OF THE DRAWINGS

An embodiment of the present invention will now be described by way of example and with reference to the drawings, in which:

FIG. 3 is diagram illustrating a multiple-carrier signal sensor of mobile phones according to a first embodiment of the invention, FIG. 4 is diagram illustrating in more detail the multiple-carrier signal sensor shown in FIG. 3, FIG. 6 is a diagram illustrating a multiple-carrier signal sensor for mobile phones according to a second embodiment, being based on digital replication of a single baseband signal, and FIG. 7 is a diagram illustrating a multiple-carrier signal sensor for mobile phones according to a third embodiment, in which signals having separate scrambling codes are combined to form a signal that is sent in the multiple carrier bands.

DETAILED DESCRIPTION

When considering known sensors of mobile phones, the inventors realised that mobile phones could belong to any of a range of networks each having an associated carrier frequency band, so the known sensor is configured to detect multiple different carrier signals each having its own frequency band. Two examples of known systems are described below before we turn to embodiments of the invention.

Figure 1A:
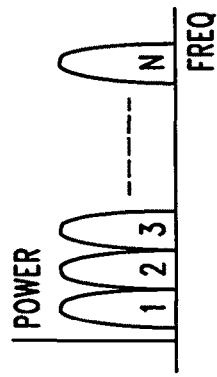
FIG. 1 is a diagram illustrating a known multiple-carrier signal sensor of mobile phones (PRIOR ART)
Figure 1:
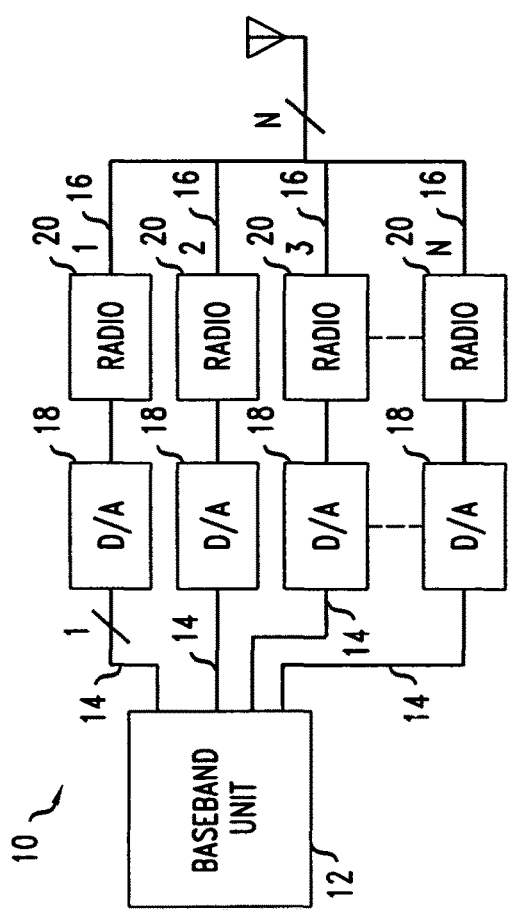

As shown in FIG. 1, one known approach is to simply have a sensor 10 in which the baseband unit 12 provides multiple signals 14 each of which takes a respective path 16 passing through a respective digital-to-analogue converter 18 and a respective radio 20. The paths are then combined so that the signals are transmitted by the single antenna 22. In this example there are N signals 14 (denoted 1, 2, 3, . . . N) and hence N paths 16. As indicated in the associated FIG. 1a, the N carrier signals, each having a respective frequency band, are different.

The inventors realised that the baseband unit 12 is complex, being required to handle both N data streams in the transmit direction as described above, and also N data streams in the corresponding receive direction.

Figure 2A:
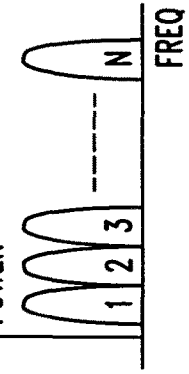
FIG. 2 is a diagram illustrating another known multiple-carrier signal sensor of mobile phones (PRIOR ART)
Figure 2:
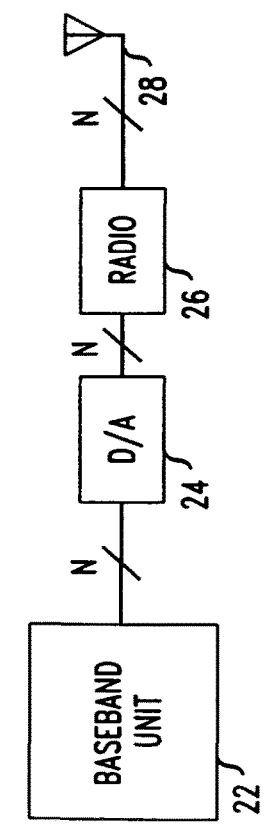

As shown in FIG. 2, another known approach is to process a wideband baseband signal from a baseband unit 22 via a single digital-to-analog converter 24 and a single radio 26 connected to a single antenna 28. As shown in FIG. 2, N different signals are produced by the baseband unit 22, converted from digital to analogue, and passed through the radio 26 capable of handling the N signals each having a different frequency band.

This inventors realised that, in this prior art approach, the baseband unit is complex, being required to handle both N data streams in the transmit direction as described above, and also N data streams in the corresponding receive direction. In practice, the baseband unit would require a high input/output bandwidth baseband processor to process the signals for transmission and received signals at say 60 MHz.

The inventors realised it was possible to provide a sensor for mobile user terminals, the sensor having multiple carrier frequency bands ("carriers") with a common baseband signal. A common baseband signal is transmitted on all transmission carrier frequency bands. Correspondingly, multiple receive carrier frequency bands are received, down-converted and summed to provide a single baseband signal.

The inventors realised that making use of a common baseband signal among carriers was simple way for a sensor based on a femtocell to identify a user terminal that may be operating on any of a variety of carrier bands. It also enables communication with user terminals on the carrier frequencies assigned to their respective networks.

The inventors realised that the common signal transmitted on the multiple carriers should be attractive to user terminals from any of multiple Public Land Mobile Networks so that the user terminals attach to the sensor. The sensor can then allow the service such as payment by users, access control to users, for example unlocking a car door.

Four examples will now be described. In the first and second examples, a common PLMN identifier is sent on all carriers, that PLMN identifier having been communicated to the user terminals by the networks in advance. That PLMN identifier is acceptable to the user terminals to trigger attachment to the sensor on being detected from the sensor. In the third and fourth examples, signals from networks to which different scrambling codes are applied, form a single composite baseband signal that is transmitted on the multiple carriers.

Sensor Involving Analogue Processing and a Common PLMN Identifier

As shown in FIG. 3, a sensor 30 includes a transceiver 32 connected to radio-and-replicate circuitry 34. The circuitry 34 is connected to a near-field antenna 36. The transceiver 32 includes a baseband unit 38, and a digital/analogue converter block 40.

As shown in more detail in FIG. 4, the baseband unit 38 is connected to a Digital to Analogue converter 42 of the converter block 40 which is connected to a frequency up-converter 44. The frequency up-converter is connected to an analogue transmit circuit 46 of the radio&replicate circuitry 34. The radio&replicate circuitry 34 also includes an analogue receive circuit 48 connected to a frequency down-converter 50 which is connected via an Analogue to Digital converter 52 to the baseband unit 38.

On the antenna 36 side, the analogue transmit circuit 46 and analogue receive circuit 48 are connected to a duplexer 54 which is connected to the antenna 36. The duplexer 54 conditions the signals before transmission over air or reception processing.

In use the baseband unit 38 provides a (single) baseband signal to the Digital to Analogue converter 42, the output signal from which is up-converted by the frequency up-converter 44 to provide a (single) signal at an RF carrier band. As explained in more detail below, the analogue transmit circuit 46 produces multiple carriers (five in this example) to the duplexer 54. Each carrier contains the same baseband signal.

In use the received signal fed to the baseband unit 38 is produced from multiple carriers. As explained in more detail below, the antenna receives at multiple carrier bands (five in this example) and these are processed by the analogue receive circuit 48 into a single RF carrier signal which is frequency down-converted by the down-converter 50 to digital by the A-to-D converter 52 and input to the baseband unit 38.

As shown in FIG. 3a, a single baseband signal is replicated across multiple carriers for transmission; and on the receive side, multiple analogue signals on separate carriers are combined to produce a single baseband signal. To the baseband unit 38, it appears that the individual uplink transmissions were all received on a common carrier. Assignment of uplink codes is performed in conventional manner so as to distinguish, in the code domain, traffic to individual users.

Common PLMN Identifier

When a cell is detected by a user terminal as a candidate to provide service to the user terminal, amongst other things the user terminal inspects the cell's PLMN identifier. To create a baseband signal that will be acceptable to user terminals associated with various network operators, a PLMN identifier is included that is universally acceptable across the networks; in other words, acceptable to all user terminals of the various networks in the country in which the sensor is to be used.

This universal PLMN identifier is communicated to a user terminal by the network during a registration area update, and from then on the user terminal considers that PLMN to be suitable for connection. To aid such connections, which can be handover (when user terminal in active mode) or cell reselection (when user terminal in idle mode), the network is informed of the sensor's identity, so for example the neighbour lists of cells nearby are updated to include a reference to the sensor as a neighbour for cell reselection/handover.

Radio&Replicate Circuitry

Figure 5:
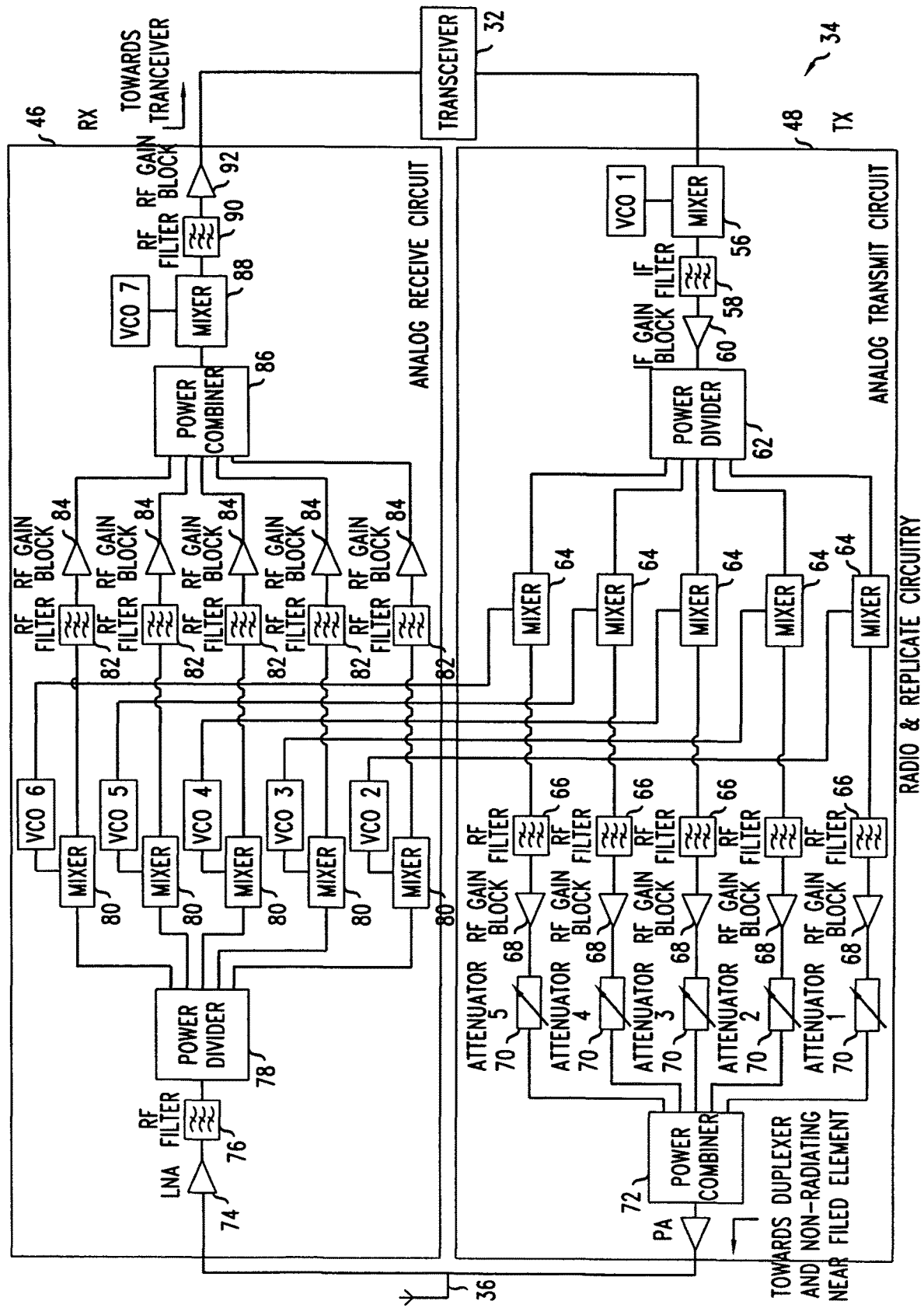
FIG. 5 is a diagram illustrating in more detail radio&replicate circuitry of the sensor shown in FIGS. 3 and 4.

The radio&replicate circuitry 34 is shown in more detail in FIG. 5.

As shown in FIG. 5, the modulated transmit signal from the transceiver 32, which in this example is centred at 2112.5 MHz, is down-converted by a voltage controlled Oscillator (VCO) denoted VCO1 and a mixer 56 to a common Intermediate Frequency (IF) signal, for example 167 MHz. This means that the continuous wave signal from VCO1 operates at a frequency of 1945.5 MHz. The IF signal is then filtered by IF filter 58 to remove the unwanted mixing products, amplified by IF gain block 60 to compensate for losses due to down-conversion, and split by power divider 62 into five signals of equal power. These five IF signals are then each upconverted to provide a carrier of desired frequency by using the respective mixer 64 and voltage controlled oscillator VCO2 to VCO6. In order to achieve downlink frequencies of 2110 to 2170 MHz, VCO2 to VCO6 tune their respective continuous wave outputs to the 2279.5 to 2334.5 MHz range. In this way, the transmit baseband signal originally centred at 2112.5 MHz is replicated at 5 different frequency carriers. The actual frequency of each replicated carrier is controlled by the respective voltage controlled oscillator VCO2 to VCO6.

The replicated transmit signals are then filtered, by respective RF filters 66, and amplified, by respective RF gain block 68, to compensate for unwanted intermodulaton products and conversion loss. The powers of the signals for transmission are controlled by respective attenuators 70. The resultant signals are combined in power combiner 72 and then passed via a power amplifier 74, through a duplexer/circulator (not shown) to the antenna 36 which is a not-widely-radiating ("non radiating") near-field element.

As regards reception, the received signal from the antenna 36, which contains up to five different frequency carriers, is passed via a duplexer/circulator (not shown), a low noise amplifier 74, an RF filter 76 and split by a power divider 78 into five signals of equal power. Using mixers 80 and the same voltage controlled oscillators VCO2 to VCO6 as for transmission, and taking the uplink frequency range to be 1920 to 1980 MHz, five IF signals centred at 357 MHz are created. The five signals are filtered by respective RF filters 82 and amplified by respective RF gain blocks 84 then supplied to a power combiner 86. (In an otherwise similar example, for additional power control, attenuators are added to each 357 MHz signal branch between the RF gain blocks and power combiner.) Following up-conversion at mixer 88, which is connected to voltage controlled oscillator VCO7, the composite output signal is further filtered by RF filter 90 and amplified by RF gain block 92, then passed to the transceiver 32 for baseband processing as a single signal.

In this way, one transceiver is used to achieve multi-carrier operation.

This example uses five transmit and five receive carriers. Other examples can use different numbers of carriers.

Sensor Involving Digital Processing and a Common PLMN Identifier

Another example is shown in FIG. 6. As compared to the sensor described in relation to FIGS. 3 to 5, the same output is produced, namely a common baseband signal replicated across multiple carriers. However it is implemented in the digital domain rather than the analogue domain.

As shown in FIG. 6, the transceiver 94 includes a baseband unit 96 connected via a digital replication block 98 to a wideband D/A conversion block 100. (In an otherwise similar alternative embodiment, the digital replication block can be separate to the transceiver.) The transceiver 94 is connected to a radio 102 which is connected to an antenna 104.

The digital replication block replicates the baseband signal to produce essentially identical signals (denoted 1 as illustrated in FIG. 6*a*) in each of the N carrier bands. In other words, the radiated signal is common across all carriers.

As in the analogue case described above, to create a baseband signal that will be acceptable to user terminals associated with various network operators, a PLMN identifier is included that is universally acceptable across the networks. This universal PLMN identifier is communicated to a user terminal by the network during a registration area update, and from then on the user terminal considers that PLMN to be suitable for connection. To aid such connections, which can be handover (when user terminal is in active mode) or cell reselection (when user terminal is in idle mode), the network is informed of the sensor's identity, so for example the neighbour lists of cells nearby are updated to include a reference to the sensor as a neighbour for cell reselection/handover.

It will be understood that the digitally replicated signal has at least N times the bandwidth of a single carrier signal, where N is the number of carriers. In this Universal Mobile Telecommunications System (UMTS) example, the digitally replicated signal can take a bandwidth of 60 MHz compared to a 5 MHz single carrier signal. To provide this, the digital replication block 98 in this example includes a Field Programmable Gate Array, FPGA.

Sensor Involving Analogue Processing and Multiple Signals

An alternative approach, particularly useful where mobile network operators have not agreed a universal PLMN identifier, is to generate a signal for each carrier, each of these signals having a different scrambling code, and to combine them into a single base band signal for transmission. For reception, a corresponding method of down-converting and summing all signals to provide a single baseband signal is employed.

As shown in FIG. 7, a sensor 106 includes a transceiver 108, which includes the baseband unit 110 connected to a D/A conversion block 112. The transceiver 110 is connected to radio&replicate circuitry 114 which is connected to an antenna 116. In this Universal Mobile Telecommunications System (UMTS) and Wideband Code Division Multiple Access (WCDMA) example, a signal is produced which is essentially identical on each signal carrier (see FIG. 7*a* in which the signal on each carrier is denoted 1). The signals for each carrier each have a different primary scrambling code. The signals are combined by summing them to produce the single composite signal that is transmitted on each of the N carriers.

A user terminal belonging to, say a first Public Land Mobile Network, which uses a first carrier, searches for a signal inside the signal received on the first carrier that includes the appropriate PLMN identifier. The other signals on that carrier will be ignored due to having non-matching PLMNs.

In response the user terminal indicates its presence to the sensor, enabling payment, access control etc, by reference to the user terminal.

Sensor Involving Digital Processing and Multiple Signals

Using essentially the same hardware as described in respect of FIG. 6, the common signal is produced in a broadly similar way to as in the analogue case described immediately above. Specifically, multiple signals are produced each having its own scrambling code. These are combined by summing to form a single baseband signal. This signal is then passed through the digital replication block to produce N carriers each modulated by the same baseband signal.

A user terminal receives the broadcast signal and decodes it using the scrambling code provided in advance by the network. The user terminal then identifies the PLMN identifier in the decoded signal, and so attaches to the sensor.

General

In some alternatives, the above schemes are applied not only to encompass each network (PLMN) that the sensor may encounter, but also to encompass each radio access technology (RAT) the sensor may encounter, such as UMTS, GSM etc. The schemes may also be applied where a PLMN has multiple carrier bands, for example with a common baseband.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media.

Some embodiments involve computers programmed to perform said steps of the above-described methods.

The invention claimed is:

1. A method of sensing a mobile user terminal for cellular radio telecommunications, comprising:

broadcasting a common baseband signal from a sensor at each of multiple distinct carrier frequency bands associated with cellular radio telecommunications over a plurality of networks, each network of the plurality of networks being assigned one of the multiple distinct carrier frequency bands for radio signals; and receiving an acknowledgement from a user terminal associated with any one of the plurality of networks after the user terminal received the broadcast in the distinct carrier frequency band of its network, checked information in the received signal, and sent the acknowledgement to the sensor after having determined the information is acceptable to allow connection to the sensor.

2. A method according to claim 1, in which the information comprises an identifier which the user terminal has been pre-configured to consider acceptable for connection to the sensor, the identifier being a common identifier of each of the plurality of networks.

3. A method according to claim 2, in which the identifier is a universal PLMN identifier.

4. A method according to claim 1, in which the common baseband signal is generated by generating signals each including a different primary scrambling code, each primary scrambling code being associated with a corresponding respective one of the networks, and combining those signals as the common baseband signal for broadcast.

5. A method according to claim 4, in which the user terminal receiving the signal includes the user terminal decoding the received signal using the primary scrambling code associated with the network to which the user terminal is assigned, so as to provide the information for checking.

6. A method according to claim 5, in which the information is the PLMN identifier of the network with which the user terminal is associated.

7. The method according to claim 1, wherein the sensor is at least one of a cellular base station, a small cell base station, and a femto base station.

8. The sensor according to claim 1, wherein the sensor is at least one of a cellular base station, a small cell base station, and a femto base station.

9. A sensor for sensing a mobile user terminal for cellular radio telecommunications, the sensor being:

configured to broadcast a common baseband signal at each of multiple distinct carrier frequency bands associated with cellular radio telecommunications over a plurality of networks, each network of the plurality of networks being assigned one of the multiple distinct carrier frequency bands for radio signals; and configured to receive an acknowledgement from a user terminal associated with any one of the plurality of networks after the user terminal received the broadcast in the distinct carrier frequency band of its network, checked information in the received signal, and sent the acknowledgement to the sensor after having determined the information was acceptable to allow connection to the sensor.

10. A sensor according to claim 9, in which the information comprises an identifier which the user terminal has been pre-configured to consider acceptable for connection to the sensor, the identifier being a common identifier of each of the plurality of networks.

11. A sensor according to claim 10, in which the identifier is a universal PLMN identifier.

12. A sensor according to claim 9, in which the common baseband signal is generated by transceiver and radio circuitry configured to generate signals each including a different primary scrambling code, each primary scrambling code being associated with a corresponding respective one of the networks, and a combiner configured to combine those signals as the common baseband signal for broadcast.

13. The sensor according to claim 9, wherein, in conjunction with the user terminal receiving the signal, the user terminal is configured to decode the received signal using the primary scrambling code associated with the network to which the user terminal is assigned so as to provide the information for checking.

14. The sensor according to claim 13, wherein the information is a PLMN identifier of the network with which the user terminal is associated.

15. A mobile user terminal for cellular radio telecommunications, the user terminal being:

configured to receive a common baseband signal from a sensor, wherein the common baseband signal was broadcast by the sensor at each of multiple distinct carrier frequency bands associated with cellular radio telecommunications over a plurality of networks, each network of the plurality of networks being assigned one of the multiple distinct carrier frequency bands for radio signals, wherein the broadcast of the common baseband signal is received by the user terminal in the distinct carrier frequency band of its network;

configured to check information in the received signal; and configured to send an acknowledgement to the sensor after having determined the information is acceptable to allow connection to the sensor.

16. A mobile user terminal for cellular radio telecommunications according to claim 15, in which the information comprises an identifier, and the user terminal has been pre-configured to consider the identifier acceptable for connection to the sensor, the identifier being a common identifier of each of the plurality of networks.

17. A mobile user terminal for cellular radio telecommunications according to claim 16, in which the identifier is a universal PLMN identifier.

18. A mobile user terminal for cellular radio telecommunications according to claim 15, in which the user terminal is configured to decode the received signal using the primary scrambling code associated with the network to which the user terminal is assigned, so as to provide the information for checking.

19. The mobile user terminal for cellular radio telecommunications according to claim 15, the received signal being a common baseband signal that was generated by generating signals each including a different primary scrambling code, each primary scrambling code being associated with a corresponding respective one of the networks, and combining those signals as the common baseband signal.

20. A mobile user terminal according to claim 19, in which the information is the PLMN identifier of the network with which the user terminal is associated.

* * * * *